United States Patent
Buyukkokten et al.

(10) Patent No.: US 8,015,119 B2
(45) Date of Patent: Sep. 6, 2011

(54) METHODS AND SYSTEMS FOR THE DISPLAY AND NAVIGATION OF A SOCIAL NETWORK

(75) Inventors: Orkut Buyukkokten, Mountain View, CA (US); Adam Douglas Smith, Mountain View, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 10/928,654

(22) Filed: Aug. 26, 2004

(65) Prior Publication Data

US 2005/0159970 A1 Jul. 21, 2005

Related U.S. Application Data

(60) Provisional application No. 60/538,035, filed on Jan. 21, 2004.

(51) Int. Cl.
*G06Q 99/00* (2006.01)
(52) U.S. Cl. ......................................................... 705/319
(58) Field of Classification Search ........................ 705/1
See application file for complete search history.

(56) References Cited

U.S. PATENT DOCUMENTS

| | | | |
|---|---|---|---|
| 5,287,498 A | 2/1994 | Perelman et al. | |
| 5,537,586 A | 7/1996 | Amram et al. | |
| 5,950,200 A | 9/1999 | Sudai et al. | |
| 5,963,951 A | 10/1999 | Collins | |
| 6,041,311 A | 3/2000 | Chislenko et al. | |
| 6,049,777 A * | 4/2000 | Sheena et al. | 705/10 |
| 6,052,122 A | 4/2000 | Sutcliffe et al. | |
| 6,061,681 A | 5/2000 | Collins | |
| 6,073,105 A | 6/2000 | Sutcliffe et al. | |
| 6,073,138 A | 6/2000 | de l'Etraz et al. | |
| 6,092,049 A | 7/2000 | Chislenko et al. | |
| 6,185,559 B1 | 2/2001 | Brin et al. | |
| 6,256,648 B1 | 7/2001 | Hill et al. | |
| 6,285,999 B1 | 9/2001 | Page | |
| 6,327,590 B1 | 12/2001 | Chidlovskii | |
| 6,366,962 B1 | 4/2002 | Teibel | |
| 6,389,372 B1 | 5/2002 | Glance et al. | |

(Continued)

FOREIGN PATENT DOCUMENTS

JP 11265369 9/1999

(Continued)

OTHER PUBLICATIONS

Amazon.com, "Feedback FAQ" web page at http://www.amazon.com/exec/obidos/tg/browse/-/1161284/qid=1091110289/sr=1-1/002-2, as available via the Internet and printed on Jul. 29, 2004.

(Continued)

*Primary Examiner* — Jonathan Ouellette
(74) *Attorney, Agent, or Firm* — Patent Law Works LLP

(57) ABSTRACT

Systems and methods for the display and navigation of a social network or set forth. According to one embodiment a method comprising identifying a first profile in a social network, identifying associated profiles associated with the first profile, ranking the associated profiles, wherein ranking is not based exclusively on a degree of separation, and outputting the associated profiles based at least in part on the ranking is set forth. According to another embodiment a method comprising identifying a user profile, identifying a member profile, determining an association path for the user profile and the member profile, and outputting the association path is set forth.

28 Claims, 5 Drawing Sheets

U.S. PATENT DOCUMENTS

| | | |
|---|---|---|
| 6,526,440 B1 | 2/2003 | Bharat |
| 6,529,903 B2 | 3/2003 | Smith et al. |
| 6,594,673 B1 | 7/2003 | Smith et al. |
| 6,615,209 B1 | 9/2003 | Gomes et al. |
| 6,658,423 B1 | 12/2003 | Pugh et al. |
| 6,665,715 B1 | 12/2003 | Houri |
| 6,678,681 B1 | 1/2004 | Brin |
| 6,725,259 B1 | 4/2004 | Bharat |
| 6,754,873 B1 | 6/2004 | Law et al. |
| 6,834,195 B2 | 12/2004 | Brandenberg et al. |
| 6,837,436 B2 | 1/2005 | Swartz et al. |
| 6,865,546 B1 | 3/2005 | Song |
| 6,871,186 B1 | 3/2005 | Tuzhilin et al. |
| 6,895,406 B2 | 5/2005 | Fables et al. |
| 6,912,505 B2 | 6/2005 | Linden et al. |
| 7,013,292 B1 | 3/2006 | Hsu et al. |
| 7,069,308 B2 * | 6/2006 | Abrams .................... 709/218 |
| 7,080,117 B2 | 7/2006 | De Pinto et al. |
| 7,092,821 B2 | 8/2006 | Mizrahi et al. |
| 7,113,917 B2 | 9/2006 | Jacobi et al. |
| 7,117,254 B2 | 10/2006 | Lunt et al. |
| 7,118,153 B2 | 10/2006 | Lunt |
| 7,130,777 B2 | 10/2006 | Garg |
| 7,130,844 B2 | 10/2006 | Elder |
| 7,139,252 B2 | 11/2006 | Babu et al. |
| 7,234,117 B2 | 6/2007 | Zaner |
| 7,269,590 B2 | 9/2007 | Hull |
| 7,275,068 B2 | 9/2007 | Huberman et al. |
| 7,318,037 B2 | 1/2008 | Solari |
| 7,343,335 B1 | 3/2008 | Olliphant |
| 7,360,080 B2 | 4/2008 | Camnisch |
| 7,383,258 B2 | 6/2008 | Harik |
| 7,433,832 B1 | 10/2008 | Bezos et al. |
| 7,433,876 B2 | 10/2008 | Spivack et al. |
| 7,472,110 B2 | 12/2008 | Achlioptas |
| 7,478,078 B2 | 1/2009 | Lunt |
| 7,539,697 B1 | 5/2009 | Akella et al. |
| 2001/0039500 A1 | 11/2001 | Johnson |
| 2002/0023230 A1 | 2/2002 | Bolnick |
| 2002/0042791 A1 | 4/2002 | Smith et al. |
| 2002/0059130 A1 | 5/2002 | Cheng et al. |
| 2002/0059201 A1 | 5/2002 | Work |
| 2002/0103682 A1 | 8/2002 | Stemmer et al. |
| 2002/0116458 A1 | 8/2002 | Bricklin |
| 2002/0116466 A1 | 8/2002 | Trevithick et al. |
| 2002/0123988 A1 | 9/2002 | Dean et al. |
| 2002/0124053 A1 | 9/2002 | Adam et al. |
| 2002/0133365 A1 | 9/2002 | Grey |
| 2002/0133481 A1 | 9/2002 | Smith et al. |
| 2002/0143944 A1 | 10/2002 | Traversat |
| 2002/0169782 A1 * | 11/2002 | Lehmann et al. ............ 707/100 |
| 2002/0169835 A1 | 11/2002 | Paul |
| 2002/0174073 A1 | 11/2002 | Nordman et al. |
| 2002/0194112 A1 | 12/2002 | de Pinto |
| 2003/0050977 A1 | 3/2003 | Puthenkulam et al. |
| 2003/0063072 A1 | 4/2003 | Brandenberg et al. |
| 2003/0069749 A1 | 4/2003 | Shear et al. |
| 2003/0083898 A1 | 5/2003 | Wick et al. |
| 2003/0101227 A1 | 5/2003 | Fink |
| 2003/0154213 A1 | 8/2003 | Ahn |
| 2003/0163530 A1 | 8/2003 | Ribak |
| 2003/0233650 A1 | 12/2003 | Zaner |
| 2004/0042599 A1 | 3/2004 | Zaner et al. |
| 2004/0059708 A1 | 3/2004 | Dean et al. |
| 2004/0088325 A1 | 5/2004 | Elder et al. |
| 2004/0093224 A1 | 5/2004 | Vanska |
| 2004/0093324 A1 | 5/2004 | Marappan |
| 2004/0119740 A1 | 6/2004 | Chang et al. |
| 2004/0122681 A1 | 6/2004 | Ruvolo et al. |
| 2004/0122803 A1 * | 6/2004 | Dom et al. .................... 707/3 |
| 2004/0122811 A1 | 6/2004 | Page |
| 2004/0162830 A1 | 8/2004 | Shirwadkar et al. |
| 2004/0167794 A1 | 8/2004 | Shostack et al. |
| 2004/0172378 A1 | 9/2004 | Shanahan et al. |
| 2004/0193684 A1 | 9/2004 | Ben-Yoseph |
| 2004/0215793 A1 | 10/2004 | Ryan et al. |
| 2004/0221309 A1 | 11/2004 | Zaner |
| 2004/0249811 A1 | 12/2004 | Shostack et al. |
| 2004/0260781 A1 | 12/2004 | Shostack et al. |
| 2005/0015432 A1 | 1/2005 | Cohen |
| 2005/0050158 A1 | 3/2005 | Solari |
| 2005/0120084 A1 | 6/2005 | Hu et al. |
| 2005/0159998 A1 | 7/2005 | Buyukkokten et al. |
| 2005/0165785 A1 | 7/2005 | Malkin et al. |
| 2005/0171832 A1 | 8/2005 | Hull et al. |
| 2005/0171954 A1 | 8/2005 | Hull et al. |
| 2005/0193054 A1 | 9/2005 | Wilson et al. |
| 2005/0197846 A1 | 9/2005 | Pezaris et al. |
| 2005/0209999 A1 | 9/2005 | Jou |
| 2005/0210409 A1 | 9/2005 | Jou |
| 2005/0216300 A1 | 9/2005 | Appelman et al. |
| 2005/0246420 A1 | 11/2005 | Little |
| 2005/0256866 A1 | 11/2005 | Lu et al. |
| 2005/0267940 A1 | 12/2005 | Galbreath et al. |
| 2006/0085259 A1 | 4/2006 | Nicholas |
| 2006/0136419 A1 | 6/2006 | Brydon et al. |
| 2006/0184997 A1 | 8/2006 | La Rotonda et al. |
| 2008/0004941 A1 | 1/2008 | Calabria |
| 2008/0133716 A1 | 6/2008 | Rao et al. |
| 2009/0013386 A1 | 1/2009 | Puthenkulam et al. |

FOREIGN PATENT DOCUMENTS

| | | |
|---|---|---|
| JP | 2002132604 | 5/2002 |
| WO | WO 0068860 | 11/2000 |
| WO | WO 2001/084266 | 11/2001 |
| WO | WO 2005/015470 A1 | 2/2005 |

OTHER PUBLICATIONS ebay, "What is eBay?" web page at http://pages.ebay.com/help/welcome/questions/about-ebay.html, as available via the Internet and printed on Jul. 29, 2004.

ebay, Bidding on Items, " How to Bid" web page at http://pages.ebay.com/help/welcome/bid.html, as available via the Internet and printed on Jul. 29, 2004.

ebay, First Time Seller, "How to Sell" web page at http://pages.ebay.com/help/welcome/sell.html, as available via the Internet and printed on Jul. 29, 2004.

Amazon.com: Help, "Selling at Amazon Marketplace" web page at http://www.amazon.com/exec/obidos/tg/browse/-/1161234/ref=hp_hp_Is_4_2/002-283572, as available via the Internet and printed on Jul. 29, 2004.

Amazon.com: Help, "New Seller FAQ" web page at http://www.amazon.com/exec/obidos/tg/browse/-/1161274/002-2835726-5513622, as available via the Internet and printed on Jul. 29, 2004.

Amazon.com, "How to get a Great Feedback Score" web page at http://www.amazon.com/exec/obidos/tg/browse/-13107471/gid=g091110, as available via the Internet and printed on Jul. 29, 2004.

ebay services, "Frequently Asked Questions" web page at http://pages.ebay.com/help/basics/faq.html, as available via the Internet and printed on Jul. 29, 2004.

Amazon.com, "Friends and Favorites" web page at www.amazon.com/exec/obidos/subst/community/community-home.html, as available via the Internet and printed on Feb. 27, 2004.

Amazon.com: Help. "Wish List" web page at www.amazon.com/exec/obidos/tg/browse/-/897204/ref=ya_hp_reg_1/002-9880811-, as available via the Internet and printed on Feb. 18, 2004.

Amazon.com: Help, "Purchase Circles," web page at www.amazon.com/exec/obidos/tg/browse/-/468604/ref=cm_pc_fag/002-0759267-82, as available via the Internet and printed on Feb. 27, 2004.

"Accounts Website," web page at http://www.cs.rice.edu/~ssiyer/accounts/, as available via the Internet and printed on Jul. 29, 2004.

Microsoft Corporation, "Is Friendster the 'Next Big Thing'?" web page at http://mobilemomentum.msn.com/artide.aspx?aid=4, as available via the Internet and printed on Jul. 29, 2004.

"Running Notes From Revenge of the User: Lessons from Creator/User Battles," web page at http://craphound.com/danahetcon04.txt, as available via the Internet and printed on Jul. 28, 2004.

Adamic, Lada et al., "A Social Network Caught in the Web," web page at http://firstmonday.org/issues/issue8_6/adamic, as available via the Internet and printed on Jul. 28, 2004.

Multiply, "Multiply Privacy Policy," web page at http://multiply.com/info/privacy as available via the Internet and printed on May 3, 2004.

Multiply, "Multiply Terms of Service," web page at http://multiply.com/info/tos, as available via the Internet and printed on May 3, 2004.

Multiply, "Help," web page at http://multiply.com/info/help, as available via the Internet and printed on May 3, 2004.

Multiply, "About Multiply," web page at http://multiply.com/info/about, as available via the Internet and printed on May 3, 2004.

Sullivan, Danny, "Is It Really Personalized Search?," web page at http://searchengine watch.com, as available via the Internet and printed on May 13, 2004.

Tribe.net, "Listings Directory," web page at http://www.tribe.net/tribe/servlet/template/pub.listings.vm, as available via the Internet and printed on Jun. 28, 2004.

International Search Report and Written Opinion, PCT/US2005/001544, Apr. 29, 2005.

PCT International Search Report and Written Opinion, PCT/US05/02240, Sep. 26, 2006, 7 pages.

"eBay: Help: Basics: Glossary: Star," eBay, [online][Retrieved on Jul. 1, 2008] Retrieved from the internet <URL:http://web.archive.org/web/20021001094558/http://pages.ebay.com/help/basics/g-stars.html>.

Kamvar, S., et al., "The Eigentrust algorithm for reputation management in P2P networks," International World Wide Web Conference Proceedings of the 12$^{th}$ International conference on the World Wide Web, Sessions: Protocols, 2003, pp. 640-651.

"PlanetAll," From Internet Archive Wayback Machine on Nov. 1997, 19 pages, [online] [Retrieved on Mar. 17, 2004] Retrieved from the internet <URL: Internet Archive Wayback Machine: www.archive.org/www/planetall.com>.

Jensen, C., et al., "Finding Others Online: Reputation Systems for Social Online Spaces," Group Spaces, CHI 2002, Apr. 20-25, 2002, pp. 447-454, vol. 4, Iss. 1.

Balabanovic, M., et al., "Content-Based, Collaborative Recommendation," Mar. 1997, pp. 66-72, vol. 40, No. 3.

Choi, J., "Netflix Prize for the best collaborative filtering algorithm," Data mining and parallelization, CGL Blog, Jul. 16, 2008, [online] [Retrieved on May 13, 2009] Retrieved from the internet <URL: http://jychoireport-cgl.blogspot.com/2008/07/netflix-prize-for-best-collaborative.html>.

Glance, N., et al., "Knowledge Pump: Supporting the Flow and Use of Knowledge," Information Technology for Knowledge Management, 1998, 22 pages.

Kautz, H., et al., "ReferralWeb: Combining Social Networks and Collaborative Filtering," Communications of the ACM, Mar. 1997, 4 pages, vol. 40, No. 3.

"Collaborative filtering," Wikipedia, Last modified Oct. 17, 2007, [online] [Retrieved on May 13, 2009] Retrieved from the internet <URL:http://web.archive.org/web/20071020061658/http:/en.wikipedia.org/wiki/Collaborative_filtering>.

Resnick, P., et al., "Recommender Systems," Communications of the ACM, Mar. 1997, pp. 56-58, vol. 40, No. 3.

Rucker, J., et al., "Personalized Navigation for the Web," Communications of the ACM, Mar. 1997, pp. 73-75, vol. 40, No. 3.

"Collaborative filtering," Wikipedia, Last modified Oct. 17, 2007, [online] [Retrieved on May 13, 2009] Retrieved from the internet <URL:http://web.archive.org/web/20071020061658/http:/en.wikipedia.org/wiki/Collaborative_filtering>.

"Mufin.com: content-based recommendations," Net, Blogs and Rock'n'Roll, Oct. 8, 2008, [online] [Retrieved on May 13, 2009] Retrieved from the internet <URL: http://www.netblogsrocknroll.com/2008/10/mufin-music-fin.html>.

"Recommender system," Wikipedia, Last modified Jul. 27, 2009, [online] [Retrieved on Aug. 6, 2009] Retrieved from the internet <URL:http://en.wikipedia.org/wiki/Recommendation_system>.

Examination Report for European Patent Application No. 05706067.5, Jun. 17, 2010, 5 pages.

Adamic, L., et al., "A social network caught in the Web", First Monday, 2003, pp. 1-22.

Agarwal, P. et al., "Enabling Real-Time User Interests for Next Generation Activity-Oriented Social Networks", A Thesis submitted to the Indian Institute of Technology Delhi in conformity with the requirements for the degree of Bachelor of Technology, 2005, 70 pages.

Anwar, Z., et al., "Leveraging 'Social-Network' Infrastructure to Improve Peer-to-Peer Overlay Performance: Results from Orkut", 2005, 9 pages.

Baird, D., et al., "Neomillennial user experience design strategies: utilizing social networking media to support "Always on Learning Styles, J. Educational Technology Systems, vol. 34(1) 5-32, 2005-2006.

Boyd, D., et al., "Social Network Sites: Definition, History, and Scholarship", Journal of Computer-Mediated Communication 13 (2008) 210-230.

Churchill, E., et al., "Social Networks and Social Networking", IEEE Internet Computing, Published by the IEEE Computer Society, Sep. Oct. 2005, pp. 14-19.

Cohen, T., et al., "Social Networks for Creative Collaboration", C&C'05, Apr. 12-15, 2005, ACM, pp. 252-255.

Decker, S., et al., "The Social Semantic Desktop", Deri Technical Report May 2, 2004, May 2004, 7 pages.

Eagle, N., et al., "Social Serendipity: Proximity Sensing and Cueing", Mit Media Laboratory Technical Note 580, May 2004, 18 pages.

Erickson, T., et al., "Social Translucence: Using Minimalist Visualizations of Social Activity to Support Collective Interaction", In Designing Information Spaces: The Social Navigation Approach (eds. K. Hook, D. Benyon, A Munroe), Springer-Verlag: London, 2003, pp. 17-41.

Gross, R., et al., "Information Revelation and Privacy in Online Social Networks", WPES'05, Nov. 7, 2005, ACM, pp. 71-80.

Hammond, T., et al., "Social Bookmarking Tools (I)", D-Lib Magazine, Apr. 2005, 23 pages, vol. 11, No. 4.

Heer, J., et al., "Vizster: Visualizing Online Social Networks", IEEE Symposium on Information Visualization, 2005, 8 pages.

Lance, G.N., et al., "Computer programs for hierarchical polythetic classification ("similarity analyses")," The Computer Journal, C.S.I.R.O. Computing Research Section, 1966, p. 60-64, vol. 9.

Lance, G.N., et al., "A Generalized Sorting Strategy for Computer Classifications," Nature, Oct. 8, 1966, p. 218, vol. 212.

Lance, G.N., et al., "A General Theory of Classificatory Sorting Strategies 1. Hierarchical Systems," The Computer Journal, C.S.I.R.O. Computing Research Section, 1967, pp. 373-380, vol. 9, No. 4.

Lance, G.N., et al., "Mixed-data classificatory programs. I. Agglomerative Systems," Austral. Comput. J., 1967, pp. 15-20, vol. 1.

Leonard, a., "You are who you know", published on www.salon.com, Jun. 15, 2004, 15 pages.

Lockheed-Martin Corporation "Battlefield awareness and data dissemination intelligent information dissemination server," AFRL-IF-RS-TR-1999-238, Final Technical Report, Nov. 1999, 31 pages.

Marwick, a.E., "Selling Your Self: Online Identity in the Age of a Commodified Internet", A thesis submitted in partial fulfillment of the requirements for the degree of Master of Arts University of Washington, 2005, 192 pages.

Metcalf, S., et al., "Spatial Dynamics of Social Network Evolution", Presented at the 23rd International Conference of the System Dynamics Society, Jul. 19, 2005, 13 pages.

Milligan, G., "Ultrametric Hierarchical Clustering Algorithms," Psychometrika, Sep. 1979, pp. 343346, vol. 44, No. 3.

Mori, J., et al., "Real-world Oriented Information Sharing Using Social Networks", Group'05, Nov. 6-9, 2005, ACM, pp. 81-84.

Nardi, B., et al., "Blogging as Social Activity, or, Would You Let 900 Million People Read Your Diary?" Cscw, Nov. 6-10, 2004, ACM, pp. 222-231, vol. 6, Issue 3.

Neumann, M., et al., "Semantic social network portal for collaborative online communities", Journal of European Industrial Training, vol. 29 No. 6, 2005 pp. 472-487.

O'Murchu, I., et al., "Online Social and Business Networking Communities", Deri - Digital Enterprise Research Institute, Deri Technical Report Aug. 11, 2004, Aug. 2004, 22 pages.

Steen, M., et al., "Development of web-centric, context-aware, adaptive mobile services requires empathy and dialogue", Freeband Frux, 2005, pp. 1-4.

Tan, P.N., et al., "Introduction to Data Mining," Chapter 8 Cluster Analysis: Basic Concepts and Algorithms (Section 8.3.3—The Lance-Williams Formula for Cluster Proximity, p. 524), 2006, pp. 487-568.

Van Eijk, R., et al., "We-centric, context-aware, adaptive mobile service bundles", Telematica Instituut, Nov. 30, 2004, 48 pages, published on Freeband.

Wenger, E., et al., "Technology for communities", Cefrio Book Chapter v 5.2, Jan 18, 2005, pp. 1-15.

Livejournal syndicated accounts (2004), last updated Jan. 6, 2004, can be retrieved at <URL:http://www.livejournal.com/syn/>, 2 pages.

NomadNet, "NomadNet News," web page at <URL:http://www.netnomad.com/> available via the Internet and printed Dec. 1, 2004, 12 pages.

Ofoto, "Ofoto Share Albums," web page at <URL:http://www.ofoto.com/ShareOverview.jsp?UV=363085663086_78428514107> as available via the Internet and printed Dec. 1, 2004, 2 pages.

Online Business Network, "Social Networking Site Guide-Ryze," web page at <URL:http://www.onlinebusinessnetworks.comlonline-social-networks-guide/ryze>, as available via the Internet and printed Dec. 1, 2004, 8 pages.

PC World, "PCWorld-ICQ Builds a Social Network," web page at <URL:http://www.pcworld.com/news/article10.aid.115084.OO.asp>, as available via the Internet and printed Dec. 1, 2004, 5 pages.

Petersen's Photographic, "My Photos at Photographic," web page at <URL:http://rnyphotos.photographic.com/>, as available via the Internet and printed Dec. 1, 2004, 19 pages.

PictureDot, " CactusVision WebCam from PictureDot.com-Broadcast your live webcam now, Free!" web page at <URL:http://www.picturedot.com?CactusVision_WebCam_Info.asp>, as available via the Internetand printed Dec. 1, 2004, 2 pages.

SAE International, "Why should I register to use the SAE website?" web page at <URL:http:my.sae.org/whyregister.htm>, as available via the Internet and printed Dec. 1, 2004, 1 page.

Theme your Desktop, "Free Webcam Thumbnails on your Desktop-Any webcam.com," web page At <URL:http://themes.anywebcam.comJdesktop/desktop.html> as available via the Internet and printed Dec. 1, 2004, 3 pages.

Westlaw, "WestClip", 2004, web page at <URL:http://west.thomson.com/westlaw/westclip>, as available via the Internet and printed Jul. 28, 2004, 3 pages.

Yahoo!, "Introducing Rss Headlines," web page at <URL:http://help.yahoo.com/config/promo content?.module=ycontent>, as available via the Internet and printed Jun. 18, 2004, 1 page.

Yahoo!, "Yahoo! Chat," web page at <URL:http://chat.yahoo.com/>, as available via the Internet and printed Dec. 1, 2004, 1 page.

Yahoo!, "Yahoo! Help-Yahoo! GeoCities Tour," web page at <URL:http://help.yahoo.com/help/us/geo/tour/tour-01.html>, as available via the Internet and printed Dec. 1, 2004, 20 pp.

Yahoo! Groups, "Customize LostDrive-ln," web page at <URL:http://groups.yahoo.com/groups/lostdrivein/confwiz>, as available via the Internet and printed Jun. 2, 2004, 10 pages.

* cited by examiner

METHODS AND SYSTEMS FOR THE DISPLAY AND NAVIGATION OF A SOCIAL NETWORK

RELATED APPLICATIONS

This application claims the benefit of the U.S. provisional application, application No. 60/538,035, entitled "Methods and Systems for the Display and Navigation of a Social Network" filed Jan. 21, 2004, which is hereby incorporated by this reference.

FIELD OF THE INVENTION

The invention generally relates to social networks. More particularly, the invention relates to methods and systems for the display and navigation of a social network.

BACKGROUND

Conventional websites may present a member's connections together with profiles associated with those connections in a list format. In such conventional websites, only a small subset of the member's connections is exposed. Conventional methods for displaying connections do not provide information or pointers to facilitate further navigation. Some conventional websites provide a network graph that displays the names of a member's connections in concentric circles depending on whether the connection is a friend, or a friend of a friend, etc. and allows a user to see links between connected profiles. Such conventional websites do not present information to the user to facilitate further navigation or allow custom viewing of the network.

SUMMARY

Embodiments of the present invention comprise systems and methods that improve social networking. One aspect of one embodiment of the present invention comprises identifying a first profile in a social network, identifying associated profiles associated with the first profile, ranking the associated profiles, wherein ranking is not based exclusively on a degree of separation, and outputting the associated profiles based at least in part on the ranking. Another aspect of one embodiment comprises identifying a user profile, identifying a member profile, determining an association path for the user profile and the member profile, and outputting the association path. Further features and advantages of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for the display and navigation of a social network. There are multiple embodiments of the present invention. By way of introduction and example, one exemplary embodiment of the present invention, provides a method for ranking and displaying profiles for members of a social network in order to help a user of the social network better visualize connections and relationships between social network members. For example, the user can see a picture of a member of the social network and desire to see that member's network of friends. The user can click on the member and a grid view of the member's friends can then be displayed. The profiles within the grid view can be highlighted to indicate if any of the member's friends are also friends of the user. The profiles can also be arranged in a ranking order based on how popular the profiles are, how active they are on the social network, or on other factors that can help the user decide which are more likely to be of interest.

This introduction is given to introduce the reader to the general subject matter of the application. By no means is the invention limited to such subject matter. Exemplary embodiments are described below.

System Architecture

Figure 1:
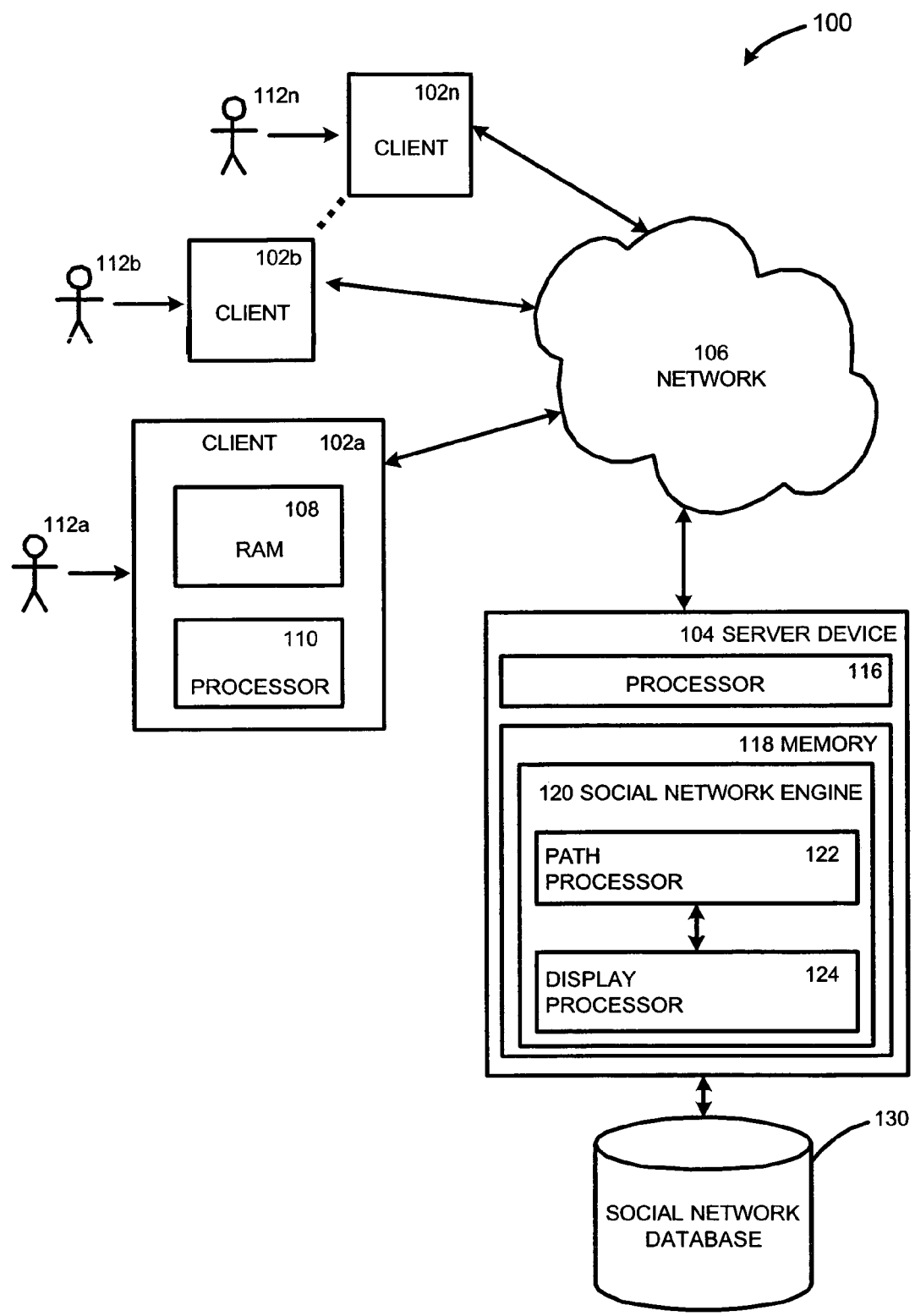
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102*a-n* in communication with a server device 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102*a-n* shown in FIG. 1 each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n can include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106.

The server device 104 shown comprises a server executing a social network engine application program, also known as a social network engine 120. The social network engine 120 allows users, such as user 112a, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Orkut.com and Friendster.com.

Social networks can comprise any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102a-n, the server device 104 shown comprises a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Each profile within a social network can contain entries, and each entry can comprise information associated with a profile. Examples of entries for a person profile can comprise contact information such as an email addresses, mailing address, IM name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information describing, identifying, or otherwise associated with a profile. Entries for a business profile can comprise industry information such as market sector, customer base, location, or supplier information; financial information such as net profits, net worth, number of employees, stock performance; or other types of information associated with the business profile.

The social network engine 120 comprises a path processor 122 and display processor 124. The path processor 122 can determine an association path between profiles. An association path can comprise the fewest number of associated profiles associating a first profile with a second profile. For example, if a profile A is associated with a profile B, and profile B is associated with a profile C, then the association path for profiles A and C comprises A,B,C. An association path comprising the fewest number of associated profiles associating a first path and a second path is referred to as a shortest association path. A type-specific association path can also be determined, wherein the fewest number of associations of a specific type are determined by the path processor 122. The path processor 122 can also determine a navigation path. A navigation path is an ordering of profiles viewed by the user 112a to reach a particular profile. For example if user 112a starts by viewing profile A and then views profile B by following a link from profile A, and finally follows another link from profile B to view profile C, the display path can be A,B,C.

The social network engine 120 further comprises a display processor 124. The display processor 124 can receive an association path from the path processor 122 and configure the association path for presentation to a user, such as user 112a. The display processor 124 can also configure a social network, or a portion of a social network, for presentation. For example, the display processor 124 can determine one or more representative entries in the profile, for example, a name and a picture, and arrange the name and picture associated with the profile so that the user 112a can easily identify the profiles when presented on the client device 102a. Configuring a social network, or a portion of a social network for presentation can further comprise determining a ranking for each of the profiles in the social network, or portion of a social network, and displaying the profiles based at least in part on the ranking for each profile. For example, the display processor 124 can determine a ranking for a profile based on a number of total profiles associated with the profile and can then arrange profiles based at least in part on ranking. For example, higher ranking profiles—in one embodiment, those having relatively greater associated profiles—an be displayed in a central location, or otherwise distinguished from lower ranking profiles when presented to the user 112a.

The display processor 124 can also present profiles in a social network, or a portion of a social network, based on entries or associations of each of the profiles. For example, the display processor can display in bold type, or otherwise emphasize or distinguish, profiles that are associated with a member currently viewing the social network such as the user 112a. Thus, for example, when the user 112a is viewing the social network, the display processor 124 can configure a portion of the social network being presented to the user 112a such that each of the names of profiles that represent friends of the user 112a are displayed in bold type. So, if associated profiles A, B, and C are presented to the user 112a, and profiles A and B represent friends of user 112a, as represented by their respective profiles, embodiments of the present invention can display the names associated with profiles A and B in bold type.

Server device 104 also provides access to storage elements, such as a social network storage element, in the example shown in FIG. 1, a social network database 130 that can be used to store profiles. Data storage elements may include any one or combination of methods for storing data, including without limitation, arrays, hash tables, lists, and pairs. Other similar types of data storage devices can be accessed by the server device 104. The social network engine 120 can receive data comprising profiles from the social network database 130 and can also send data comprising profiles to the social network database 130 for storage. The social network database 130 may be physically attached or otherwise in communication with the social network engine 120 by way of a network or other connection.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain the social networks and methods illustrated in FIGS. 2-5.

Exemplary Social Network

Figure 2:
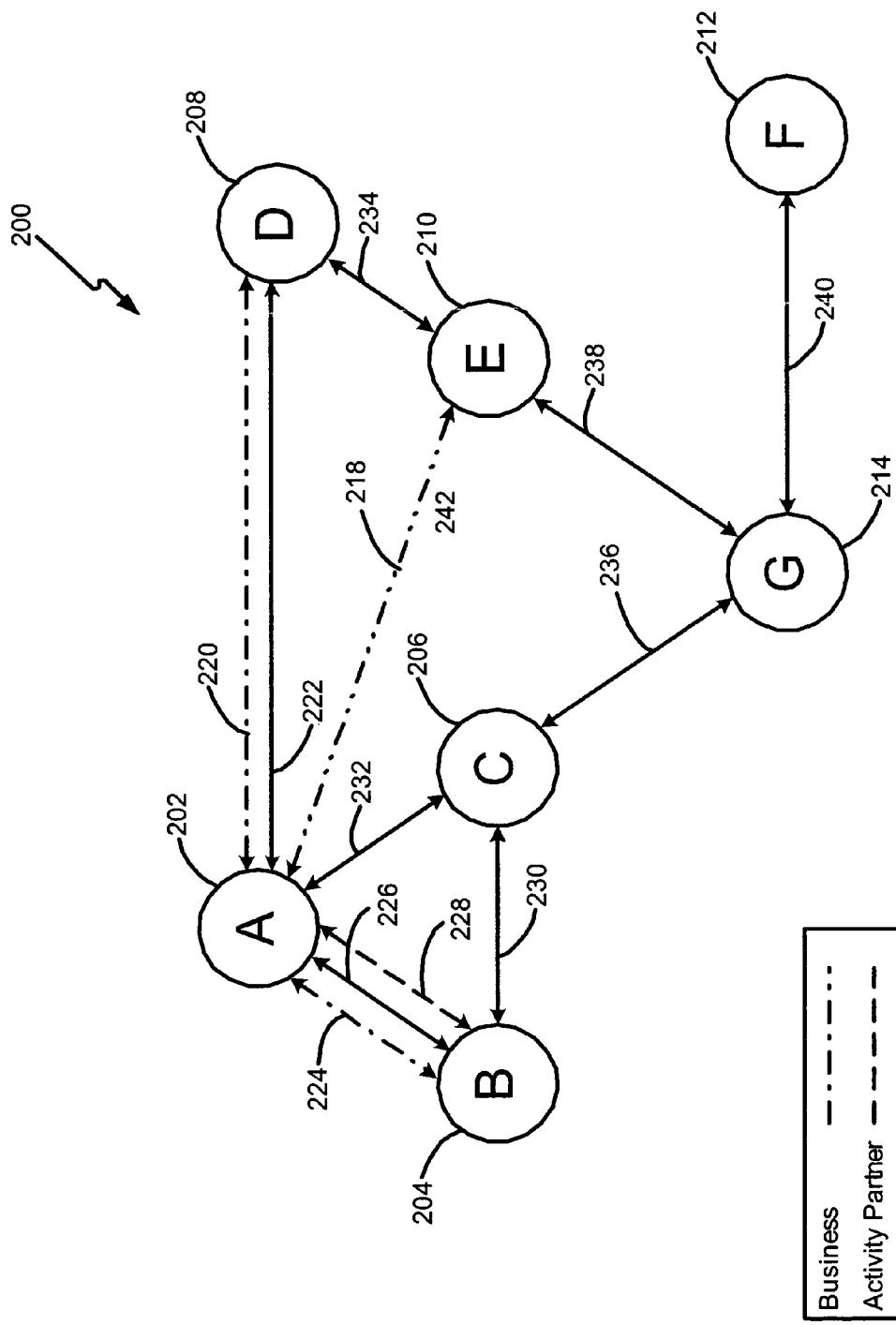
FIG. 2 illustrates one embodiment of a social network according to one embodiment of the present invention.

FIG. 2 shows a diagram of a social network 200 according to one embodiment of the present invention. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, 234, 236, 238, and 240. The vertices 202, 204, 206, 208, 210, 212, and 214 comprise profiles A, B, C, D, E, F, and G respectively. Each profile can represent a member profile of a member of the social network 200. According to another embodiment, one or more of the vertices can represent a community. The methods and systems discussed below are equally applicable to an embodiment where the vertices comprise one or more communities, but for purposes of illustration, the vertices depicted in FIG. 2 represent member profiles. The exemplary network 200 shown in FIG. 2 has seven members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain social network activity data associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member's social network profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that can be recorded in the member's profile. According to one embodiment, associations can be established by an invitation and an acceptance of the invitation. For example, a first user can send an invitation to a second user inviting the second user to form an association with the first user. The second user can accept or reject the invitation. According to one embodiment, if the second user rejects the invitation, a one-way association can be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, can be referred to as user established associations.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, 234, 236, 238, and 240 shown comprise associations between profiles. According to the embodiment shown in FIG. 2, the social network 200 comprises a plurality of differing types of associations represented by edges 218, 220, 222, 224, 226, 228, 230, 232, 234, 236, 238, and 240. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, F, and G comprising the vertices 202, 204, 206, 208, 210, 212, and 214 respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, 234, 236, 238, and 240 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends can include profile B, but a display of profile B's friends would not include profile A.

According to another embodiment, a directed or single direction association can be formed when one member indicates an association with a second member but the second member does not reciprocate the association. For example, a member associated with profile A can indicate that he is a friend of a member associated with profile B. The member associated with profile B in this example can decide not to indicate that the member associated with profile A is a friend. According to one embodiment, profile B would not be displayed with profile A's friends nor would profile A be displayed with profile B's friends as the association was not reciprocated by profile B. Similarly, profile B may not be included, for example, within a listing of friends of profile A for purposes of determining degrees of separation, for example. Thus, in such an embodiment, the displaying of profile B can be controlled by the associations the member associated with profile B assents to.

Within a social network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example can be that profile A attended the same high school as profile E. A common characteristic association may be selected by profiles A and E to represent that they are associated in some fashion, but to not create a close association, such as with a friendship association. A type-neutral degree of association can also be determined. A type-neutral degree of association can be determined by determining the fewest number of edges connecting two vertices, regardless of type.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each association and a corresponding weighting factor prior to summing the associations. Thus, highly weighted associations would contribute less to the resulting sum than lower weighted associations.

Figure 3:
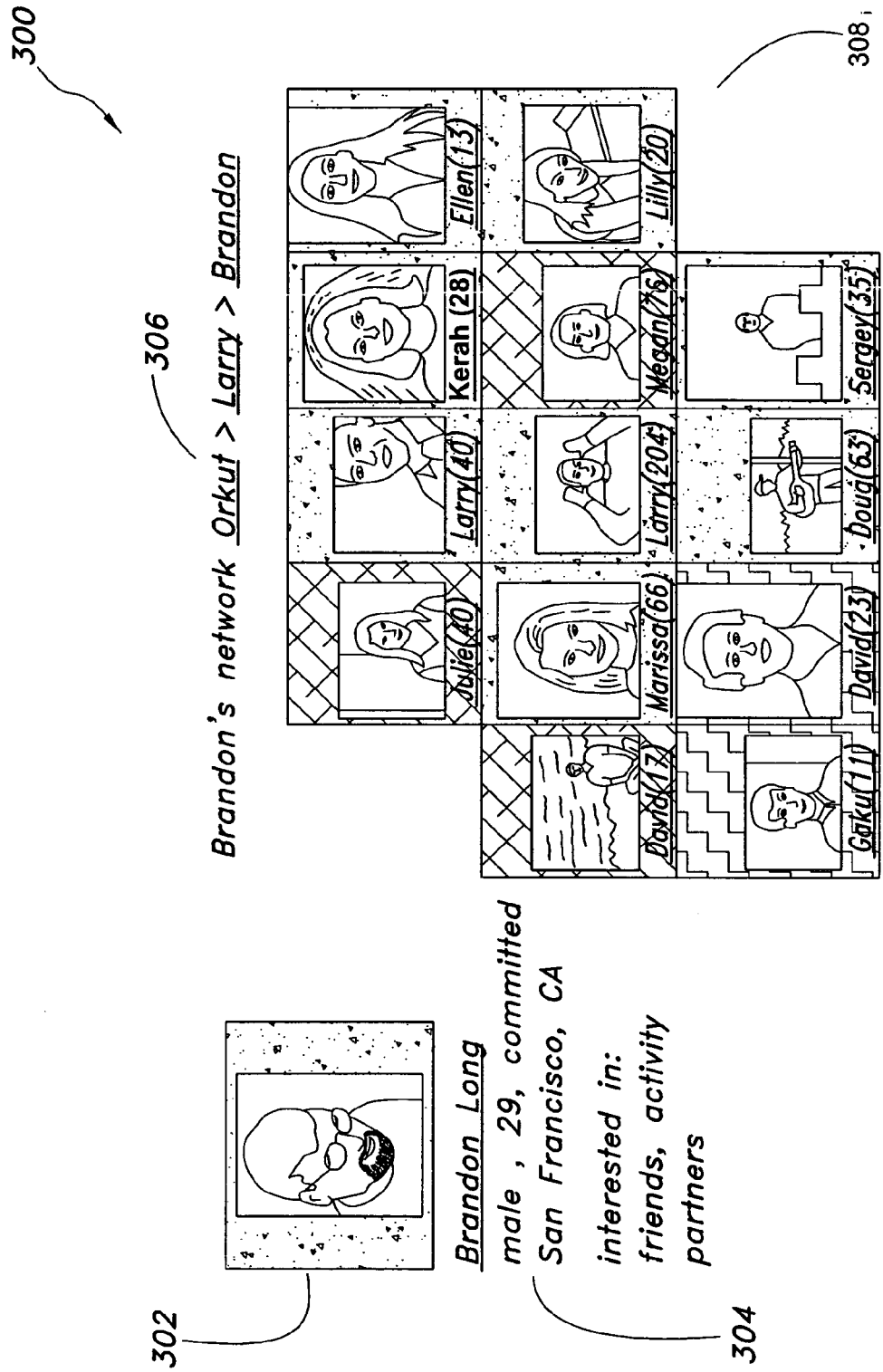
FIG. 3 illustrates one embodiment of a display according to one embodiment of the present invention.

FIG. 3 illustrates a display 300 of a social network according to one embodiment of the present invention. The display 300 comprises a selected member graphic 302, a selected member profile 304, an association path 306, and a display grid 308. The selected member graphic 302 comprises a graphic associated with the selected member profile. The selected member profile can represent a profile the user 112a has selected by clicking on a link, or other suitable input method, in order to view additional information about the profile. The selected member graphic 302 can comprise, for example, a picture, graphic, drawing, or other image associated with the selected member profile. The selected member profile 304 can comprise information describing the selected member, for example, a name, location, age, sex, and interests. The selected member profile can also contain other suitable information determined, for example, by the display processor 124 to be representative of the selected member. Alternatively, the selected member profile can display all of the information associated with the selected member.

The association path 306 can comprise one or more association paths determined by the path processor 122 including, for example, a shortest association path, a type-specific association path, or a navigation path. The association path 306 can display a name associated with each profile in the association path. For example, in the embodiment depicted in FIG. 3, "Orkut" represents the user 112a, "Larry" represents an associated profile within the association path of the user 112a and the selected member, and "Brandon" represents the selected member. By presenting an association path, the present invention can allow the user 112a to visualize the chain of connections linking the user 112a, Orkut, to a selected member. For example, Orkut can see that he is linked to Brandon by way of Larry. The names representing the profiles in the association path can comprise links to the represented profile.

The display grid 308 can further comprise graphics associated with a plurality of associated profiles, names associated with each of the profiles within the plurality of profiles, and a number representing a total number of associations for the associated profile. For example, a graphic above "Kerah" in FIG. 3 can represent an associated profile "Kerah," and the number "28" to the right of "Kerah" can represent a total number of profiles associated with "Kerah." The number representing a total number of profiles associated with an associated profile can help a user navigate the social network by pointing the user 112a towards profiles that will be associated with more profiles and thus pointing the user 112a away from "dead ends," or profiles that are associated with few or no other profiles.

Process

Various methods in accordance with the present invention may be carried out. One exemplary method according to the present invention comprises identifying a first profile in a social network, identifying associated profiles associated with the first profile, ranking the associated profiles, wherein ranking is not based exclusively on a degree of separation, and outputting the associated profiles based at least in part on the ranking.

According to another embodiment the ranking can be based at least in part on social network activity data. The social network activity data can comprise one or more of login frequency, number of logins, date of last profile update, existence of an email address, existence of a picture, and instant messaging availability status. According to another embodiment the ranking can be based at least in part on biography data. The biography data can comprise one or more of age, name, interests, and geographical location. According to another embodiment the ranking can be based at least in part on popularity data. The popularity data can comprise one or more of a number of profiles associated with a first profile, feedback, and rating data. According to another embodiment the ranking can be based at least in part on data indicating relatedness. The data indicating relatedness can comprise one or more of an amount of common entries, a degree of separation, and an amount of contacts between profiles. According to another embodiment the ranking can be based on custom settings entered by a user.

Another exemplary method of one embodiment of the present invention comprises identifying a user profile, identifying a member profile, determining an association path for the user profile and the member profile, and outputting the association path. According to another embodiment, the association path can comprise a shortest path, type specific path, or navigation path. According to another embodiment the profiles can be displayed in a grid format and can be positioned based on ranking order.

Figure 4:
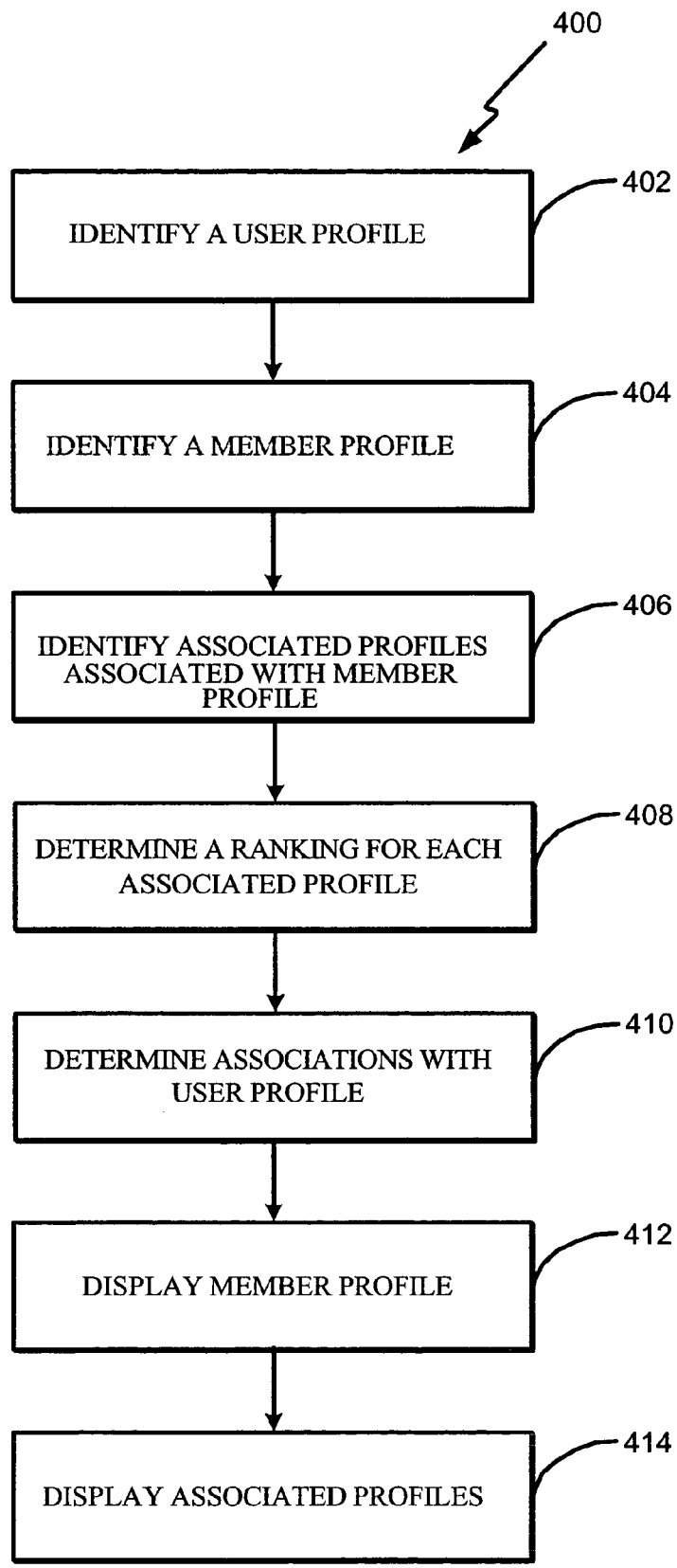
FIG. 4 illustrates a flow diagram of one embodiment of a method carried out by the present invention.

FIG. 4 illustrates a method 400 in accordance with one embodiment of the present invention. The method 400 illustrated in FIG. 4 begins in block 402, wherein the social network engine 120 identifies a user profile. The user profile can correspond to the profile of the user viewing the social network, such as the user 112a. Once the social network engine 120 identifies a user profile, the method 400 proceeds to block 404, wherein the social network engine 120 determines a member profile. The member profile can be, for example, a profile of a member of the social network that the user 112a desires to learn more about and selects, for example, by clicking on a link to the profile, such as the link "Larry" depicted in FIG. 3. According to other embodiments, the member profile can be identified by other suitable methods such as selecting a default member profile or selecting a last viewed member profile.

Once a member profile is determined, the method 400 proceeds to block 406, wherein the social network search engine 120 identifies associated profiles associated with the member profile determined in block 404. The associated profile can comprise, for example, profiles associated by a specific type of association, such as a friendship association, or profiles associated by any or all other types of associations within a social network. By determining associated profiles by a certain type of association, the method 400 can cause the display of a type-specific social network. By selecting profiles associated by each and every type of association in a social network, the method 400 can cause the display of a type-neutral social network.

Once associated profiles are identified by the network search engine 120, the method 400 proceeds to block 408, wherein the display processor 124 determines a ranking for each associated profile. Ranking associated profiles can help the user 112a find profiles more likely to be of interest and otherwise facilitate navigation of the social network. For example, some users of a social network may initially set up an account but access the account infrequently or cease using it altogether. Such users may not be as desirable of associations as users who frequently access the social network. The display processor 124 can rank profiles to help users easily identify, for example, which profiles are more active than others.

There are many ways in which the associated profiles can be ranked. The ranking for an associated profile can be determined, for example, based on social network activity data, biography data, popularity data, relatedness data, or other suitable types of data tending to distinguish profiles.

Ranking profiles based on social network activity can comprise, for example, ranking users based on how frequently or how often a member of the social network logs on to the social network, how often or how recently a member has updated his profile information, when a member joined the social network, whether a member is currently available for instant messaging, whether a member has an available email address, a picture, or other identifiers associated with his profile, or other information tending to indicate that a member is actively using or available on the social network.

Ranking profiles based on biography data associated with a profile can comprise, for example, ranking profiles based on age, name, geographical location, interests, or other suitable information associated with the profile. For privacy concerns, the display processor 124 can require a permission indication for sharing biography information prior to ranking profiles based on such information. As an example of ranking based on biography date, the display processor 124 can identify an age associated with the user's 112a profile and identify ages for associated profiles. The display processor 124 can then rank the profiles based on closeness of age and output the profiles such that profiles closer in age to the user 112a are emphasized over other profiles, for example. As other examples of ranking based on biography data, the display processor 124 can cause the profiles to be ranked alphabetically to facilitate locating known profiles, or ranked based on geographical location. For example, the user's 112a profile can indicate a geographical location of California, and associated profiles can be ranked according to the closeness of their geographical to California. Thus, for example, a profile indicating a geographical location of New York can be ranked lower than a profile indicating a geographical location of Arizona, and thus the user 112a can more readily identify local users.

Ranking based on popularity data can comprise, for example, ranking profiles based on a number of profiles to which the profile is associated, ranking profiles based on feedback or ratings from social network members, or raking profiles based on other suitable indications of popularity for a user profile. For example, the display processor 124 can determine how many profiles are associated with each profile and rank profiles associated with a greater number of profiles higher than those associated with fewer profiles. In determining how many profiles are associated with a given profile, the display processor 124 can identify how many profiles are within a certain degree of separation from the given profile. For example, the display processor 124 can identify how many profiles are within one degree of separation and thus determine a popularity based, for example on how many "friends" a profile has and not on how many "friends of a friend" the profile has. Alternatively, other degrees of separation could be used. Additionally, the display processor 124 can determine a rating score recursively factoring in a number of profiles associated in turn with each associated profile.

Ranking based on popularity can also comprise receiving feedback or ratings from members of the social network. For example, the social network engine 120 can allow members of the social network to enter ratings for a given member of the social network and store the ratings in association with the given member. Ratings can include, for example, indications of how friendly, attractive, cool, trustworthy, etc. the given member is perceived to be. The ratings can be compiled by the display processor 124 to determine a ranking for the profiles of the social network thus enabling a user to easily identify which profiles are perceived to be more popular.

Rankings based on relatedness data can comprise, for example, ranking based on an amount of common entries between profiles, a degree of separation between profiles, an amount of contacts such as instant messages or emails between contacts, or other suitable data indicating how closely related two profiles are. For example, the display processor 124 can identify that the user 112a has sent and received a high number of emails from a certain member of the social network. The display processor 124 can thus determine a higher ranking for the certain member of the social network than for an other members with whom the user 112a has had little contact.

The ranking for each associated profile can be specific to the user 112a viewing the social network, or non-user specific. For example, if the user 112a has indicated a strong association with the associated profile receiving a ranking, the associated profile can receive a higher ranking. If another user, for example user 112b, has indicated a dislike of the same associated profile, the associated profile can receive a lower ranking when the social network is being viewed by user 112b. Alternatively, each associated profile can receive the same ranking based on factors independent of which user is viewing the social network.

Once a ranking for each associated profile is determined, the method 400 proceeds to block 410, wherein associations with the user profile are determined. The associations with the user profile can comprise associations between an associated profile and the profile of the user 112a. For example, in the social network depicted in FIG. 3, "Kerah" is an associated profile, and "Orkut" is the profile of the user 112a. During block 410, the social network engine 120 can determine associations between "Kerah" and "Orkut." The associations determined in block 410 can be passed to the display processor 124. The display processor 124 can then format the name representing the associated profile based in part on the associations received from the social network engine 120. For example, in FIG. 3, "Kerah" comprises a friend association with "Orkut." The social network search engine can determine the friend association between "Kerah" and "Orkut" and pass this association to the display processor 124.

The display processor 124 can then configure the social network so that the name "Kerah" is highlighted in some fashion such as with a distinguishing color, font, or typeface. For example, in FIG. 3, the name "Kerah" appears in bold typeface. The distinguished typeface for "Kerah" can indicate to the user 112a that "Kerah" is a friend of the user 112a. The social network engine 120 can determine other associations between the associated profile and the user 112a including other types of profile associations, such as business associations or acquaintance associations, as well as other associating information such as common interests, common location, common age, or any other suitable associating information. The associating information can be determined, for example, by matching entries within profiles. Entries can be matched by determining same or similar entries, determining matching part and counter-part entries—such as "men seeking women" and "women seeking men," or by concept clustering.

Once associations are determined between the associated profile and the user profile, the method 400 proceeds to block 342 wherein the display processor 124 causes the display of the member profile. The display processor 124 can cause the member profile to be displayed, for example, similar to the display illustrated in FIG. 3. The display processor 124 can select representative entries within the member profile, for example a name, age, sex, relationship status, location, and interests of the member. The display processor 124 can also cause an icon, graphic, picture, or other image associated with the profile to be displayed. Additionally, the display processor 124 can determine a background color for the member profile corresponding to an entry, attribute, rating, or score associated with the member profile. For example, if the member profile has been rated "cool" by other users, the display processor 124 can reflect this by causing the display of a blue background color for the member profile. In the exemplary embodiment illustrated in FIG. 3, background patters are used instead of colors to indicate profile attributes. According to other embodiments, other distinguishing patterns of suitable features can be used.

Once the display processor 124 causes the display of the member profile, the method 400 proceeds to block 414, wherein the display processor 124 causes the display of the associated profiles. The associated profiles can be displayed, for example, in a display grid similar to the display grid 308 illustrated in FIG. 3. The display processor 124 can order the associated profiles based on the ranking determined in block 408. For example, the display processor can cause profiles with a higher ranking to be displayed closer to the center of a display grid. Thus, according to the embodiment illustrated in FIG. 3, "Larry (204)" in the center of the display grid 308 has a higher ranking than "Gaku (11)" in the bottom left of the display grid 308. The ranking can be determined by any suitable method, including any or all of the methods previously discussed. Additionally, the display processor 124 can determine a background color associated with each associated profile indicating an entry association, score, rating, or other feature of the associated profile. The display processor 124 can use a threshold number to determine the number of associated profiles to display in a display grid. The threshold number can be a set integer, or a variable based in part, for example, on the size of graphics or pictures associated with the profiles, the size of a browser window, the bandwidth, or other limiting capacity, of a network connection between the client device 102a and the network 106, a time constraint, performance constraint, or any other suitable factor.

Figure 5:
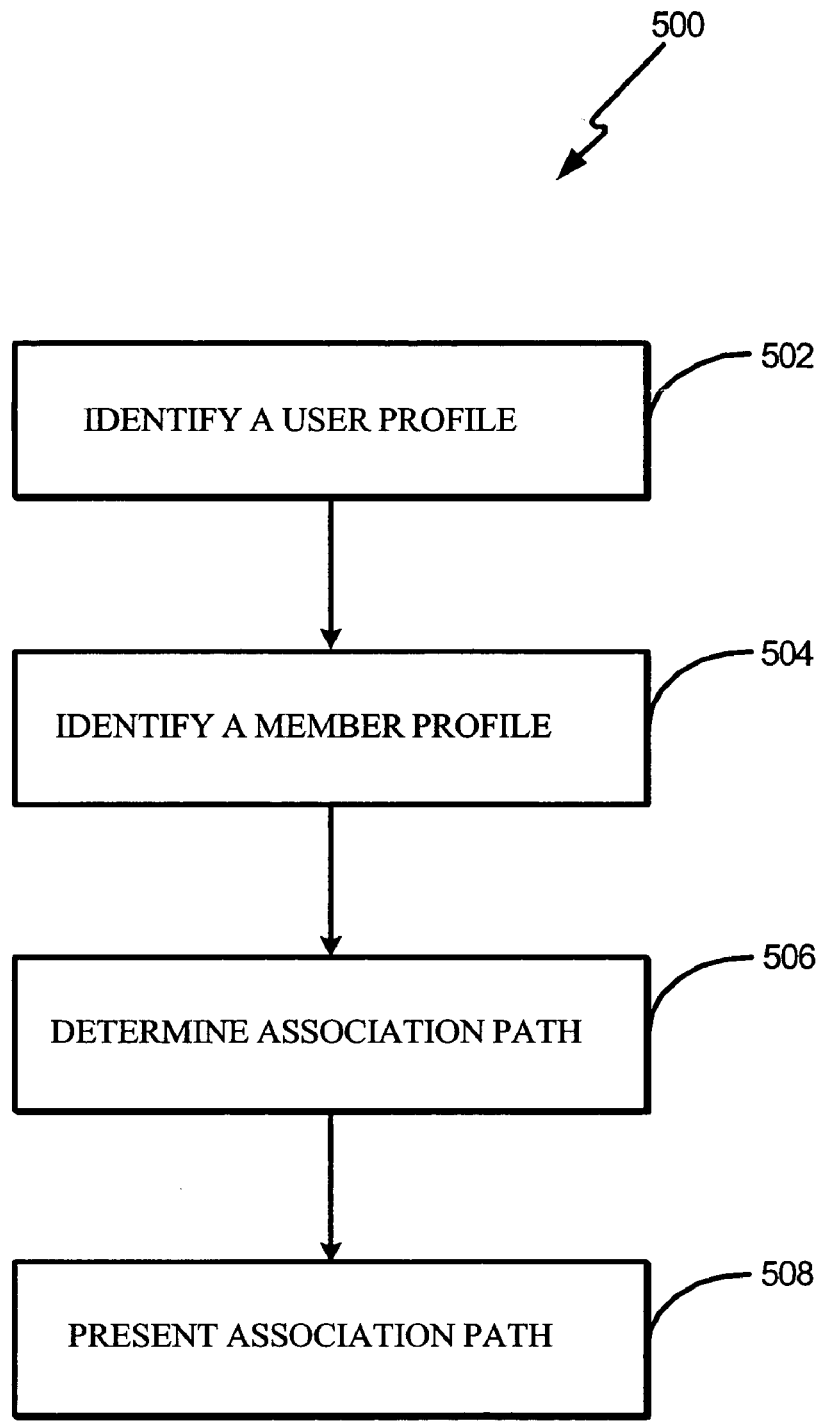
FIG. 5 illustrates another flow diagram of one embodiment of a method carried out by the present invention.

FIG. 5 illustrates a method 500 in accordance with one embodiment of the present invention. The method 500 begins in block 502, wherein a user profile is identified. The user profile can correspond to the profile of the user viewing the social network, such as user 112a. Once the social network engine 120 identifies a user profile, the method 500 proceeds to block 504, wherein the social network engine 120 identifies a member profile. The member profile can be, for example, a profile of a member of the social network that the user 112a desires to learn more about and selects, for example, by clicking on a link to the profile, such as the link "Larry" depicted in FIG. 3, or by any other suitable method.

Once a member profile is identified, the method 500 proceeds to block 506, wherein the patch processor 122 determines an association path for the user profile and the member profile determined in blocks 502 and 504. During block 506, the path processor 122 can determine any suitable type of association path including a shortest association path or a type-specific association path. An association path can be determined by determining the fewest number of edges separating associated profiles and then determining the profiles comprising the vertices joined by the edges. For example, in FIG. 2, the fewest number of edges between profiles A and F is 3, edges 232, 236, and 240. The vertices joined by those edges are 202, 206, 214, and 212. The profiles represented by these vertices are profiles A, C, G, and F. Thus the association path for profiles A and F can be A, C, G, F.

Another method of determining an association path is to determine the fewest number of edges of a certain type separating the associated profiles and to then determine the profiles comprising the vertices joined by the edges. This method of determining an association path can produce a type-specific association path. A type-specific association path is an association path determined based on one particular type of association. For example, in FIG. 2, the fewest number of friendship associations between profile A and profile E is two—the friendship association comprising edge 220 and the friendship association comprising edge 234. The profiles comprising the vertices 202, 208, and 210 joined by the edges are A, D and E. Thus, for the associated profiles A and E, the friendship association path, determined according to one embodiment of the present invention, is A, D, E.

Another type-specific association path can also be determined for profiles A and E. For example, a common characteristic association path can be determined by determining the fewest number of common characteristic associations separating profile A and profile E. According to the embodiment depicted in FIG. 2, there is one common characteristic association, comprising edge 218, separating profiles A and E. Thus, the common characteristic association path, according to the embodiment depicted in FIG. 2, is simply A, E. In addition to a shortest association path and a type-specific association path, the path processor 122 can also determine a navigation path. The navigation path can comprise the path the user 112a follows to reach a selected member profile. For example, if "Orkut" represents the user 112a who first views a profile "Larry" and then views a profile "Brandon," the navigation path can be "Orkut," "Larry," "Brandon." The navigation path can thus help the user 112a visualize the sequence of profiles viewed in reaching a selected member profile. Once the path processor 122 determines an association path, the path processor 122 passes the association path to the display processor 124.

Once the display processor 124 receives the association path, the method 500 proceeds to block 508, wherein the display processor 124 causes the association path to be presented. The association path can be presented by displaying the association path on a social network display such as the social network display depicted in FIG. 3, or by any other suitable method. A display of the association path can comprise the names of the members associated with the profiles comprising the association path presented, for example, as links to a detailed view of the profile associated with the name. According to some embodiments, the names can be presented in order of association, for example, in the social network display illustrated in FIG. 3, "Orkut" is associated with "Larry" and "Larry" is associated with "Brandon," thus, the order of the names from left to right can be "Orkut," "Larry," "Brandon." Other suitable presentations can also be used including presenting edges comprising differing types of associations between the names presented, a numbered listing, or some other suitable display method.

While the above description contains many specifics, these specifics should not be construed as limitations on the scope of the invention, but merely as exemplifications of the disclosed embodiments. Those skilled in the art will envision any other possible variations that are within the scope of the invention.

What is claimed:

1. A computer-implemented method, comprising:
identifying by a server device a first profile in a social network, the social network comprising a computer network connecting the server device and a plurality of client devices, the profiles maintained in a database;
identifying by the server device associated profiles associated with the first profile;
ranking by the server device the associated profiles, wherein the ranking is independent of a relationship to the first profile and is based on at least one of: availability for instant messaging and availability for email contact;
determining by the server device relationships between the first profile and the ranked associated profiles; and
transmitting to a display device the associated profiles based on the ranking and on the relationships between the first profile and the ranked associated profiles.

2. The method of claim 1, wherein transmitting the associated profiles comprises outputting a display grid, the display grid presenting to a user a first subset of associated profiles in a first manner indicative of a first rank and presenting to the user a second subset of associated profiles in a second manner indicative of a second rank.

3. The method of claim 2, wherein an association type for each associated profile is graphically represented to the user on the display grid so as to facilitate the user's prompt recognition of said association type for each associated profile.

4. The method of claim 2, wherein transmitting the associated profiles comprises:
outputting graphics associated with the associated profiles included in the display grid, names associated with each of the associated profiles included in the display grid, and a number representing a total number of associations for each of the associated profiles included in the display grid, and wherein the number representing a total number of associations for an associated profile points to profiles associated with more profiles.

5. The method of claim 2, wherein profiles included in the first subset of associated profiles are displayed more centrally on the display grid than profiles included in the second subset of associated profiles.

6. The method of claim 1, wherein transmitting the associated profiles comprises presenting to a user a first subset of associated profiles with a background color or a background pattern indicative of a first rank and presenting to the user a second subset of associated profiles with a background color or a background pattern indicative of a second rank.

7. The method of claim 2, wherein a threshold number is used to determine how many associated profiles to display on the display grid.

8. The method of claim 1, further comprising:
ranking the associated profiles based on at least one of: date that members corresponding to the associated profiles joined the social network, member-provided ratings, existence of a picture corresponding to each of the associated profiles, biographical information, age information, name information, interest information, location information, and user-entered settings.

9. The method of claim 1, further comprising:
determining by the server device an association path for the first profile and one of the ranked associated profiles; and
transmitting to a display device the association path.

10. The method of claim 1, further comprising ranking the associated profiles based on popularity of each of the associated profiles.

11. The method of claim 1, further comprising ranking the associated profiles based on activity levels of the associated profiles.

12. The method of claim 1, further comprising ranking the associated profiles based on recency of activity of each of the associated profiles.

13. The method of claim 1, further comprising ranking the associated profiles based on frequency of updating of each of the associated profiles.

14. The method of claim 1, further comprising ranking the associated profiles based on recency of updating of each of the associated profiles.

15. A computer-readable storage medium containing program code to be used on a computer comprising program code that instructs one or more computer processors to: identify a first profile in a social network; identify associated profiles associated with the first profile; rank the associated profiles, wherein the ranking is independent of a
relationship to the first profile and is based on at least one of: popularity of each of the associated profiles, activity levels of the associated profiles, recency of activity of each of the associated profiles, frequency of updating of each of the associated profiles, recency of updating of each of the associated profiles, availability for instant messaging, and availability for email contact;
determine relationships between the first profile and the ranked associated profiles; and
transmit the associated profiles based on the ranking and on the relationships between the first profile and the ranked associated profiles.

16. The computer-readable storage medium of claim 15, wherein transmitting the associated profiles comprises outputting a display grid, the display grid presenting to a user a first subset of associated profiles in a first manner indicative of a first rank and presenting to the user a second subset of associated profiles in a second manner indicative of a second rank.

17. The computer-readable storage medium of claim 16, wherein an association type for each associated profile is graphically represented to the user on the display grid so as to facilitate the user's prompt recognition of said association type for each associated profile.

18. The computer-readable storage medium of claim 16, wherein transmitting the associated profiles comprises:
outputting graphics associated with the associated profiles included in the display grid, names associated with each of the associated profiles included in the display grid, and a number representing a total number of associations for each of the associated profiles included the display grid, and wherein the number representing a total number of associations for an associated profile points to profiles associated with more profiles.

19. The computer-readable storage medium of claim 16, wherein profiles included in the first subset of associated profiles are displayed more centrally on the display grid than profiles included in the second subset of associated profiles.

20. The computer-readable storage medium of claim 15, wherein transmitting the associated profiles comprises presenting to a user a first subset of associated profiles with a background color or a background pattern indicative of a first rank and presenting to the user a second subset of associated profiles with a background color or a background pattern indicative of a second rank.

21. The computer-readable storage medium of claim 16, wherein a threshold number is used to determine how many associated profiles to display on the display grid.

22. The computer-readable storage medium of claim 15, further comprising program code that instructs the one or more computer processors to:

rank the associated profiles relative to each other based on at least one of: date that members corresponding to the associated profiles joined the social network, member-provided ratings, existence of a picture corresponding to each of the associated profiles, biographical information, age information, name information, interest information, location information, and user-entered settings.

23. The computer-readable storage medium of claim 15, further comprising program code that instructs the one or more computer processors to:

determine an association path for the first profile and one of the ranked associated profiles; and transmit the association path.

24. The computer-readable storage medium of claim 15, further comprising program code that instructs the one or more computer processors to rank the associated profiles based on popularity of each of the associated profiles.

25. The computer-readable storage medium of claim 15, further comprising program code that instructs the one or more computer processors to rank the associated profiles based on activity levels of the associated profiles.

26. The computer-readable storage medium of claim 15, further comprising program code that instructs the one or more computer processors to rank the associated profiles based on recency of activity of each of the associated profiles.

27. The computer-readable storage medium of claim 15, further comprising program code that instructs the one or more computer processors to rank the associated profiles based on frequency of updating of each of the associated profiles.

28. The computer-readable storage medium of claim 15, further comprising program code that instructs the one or more computer processors to rank the associated profiles based on recency of updating of each of the associated profiles.

\* \* \* \* \*